United States Patent
Yuan

(10) Patent No.: US 10,928,215 B2
(45) Date of Patent: Feb. 23, 2021

(54) METHODS AND SYSTEMS FOR LAST MILE NAVIGATION CACHE POINT OF INTEREST

(71) Applicant: HONDA MOTOR CO., LTD., Tokyo (JP)

(72) Inventor: Alvin T. Yuan, Los Angeles, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 291 days.

(21) Appl. No.: 16/107,168

(22) Filed: Aug. 21, 2018

(65) Prior Publication Data

US 2020/0064149 A1    Feb. 27, 2020

(51) Int. Cl.
*G01C 21/00* (2006.01)
*G01C 21/36* (2006.01)
*G08G 1/0962* (2006.01)
*G01C 21/34* (2006.01)

(52) U.S. Cl.
CPC ..... *G01C 21/3617* (2013.01); *G01C 21/3484* (2013.01); *G01C 21/3685* (2013.01); *G08G 1/09626* (2013.01)

(58) Field of Classification Search
CPC ........... G01C 21/3617; G01C 21/3685; G01C 21/3484; G01C 21/3626; G01C 21/3423; G01C 21/00; G08G 1/09626
USPC .............. 701/400, 424, 500, 33.4; 340/989; 713/323
See application file for complete search history.

(56) References Cited

U.S. PATENT DOCUMENTS

| | | | |
|---|---|---|---|
| 8,738,283 B2 | 5/2014 | Zhou | |
| 8,744,745 B2 | 6/2014 | Pudar et al. | |
| 8,775,059 B2 | 7/2014 | Heed et al. | |
| 8,976,063 B1 | 3/2015 | Hawkins et al. | |
| 9,019,129 B2 | 4/2015 | Skinder et al. | |
| 9,080,878 B2 | 7/2015 | Skinder et al. | |
| 9,250,079 B2 | 2/2016 | Zhou | |
| 9,377,319 B2 | 6/2016 | San Filippo et al. | |
| 9,279,696 B2 | 8/2016 | Annapureddy et al. | |
| 9,500,493 B2 | 11/2016 | Gerlach | |
| 9,696,165 B2 | 7/2017 | Shin et al. | |
| 9,812,015 B1 | 11/2017 | Cox et al. | |
| 10,474,904 B1* | 11/2019 | Correnti | G06K 9/00771 |
| 2006/0229802 A1* | 10/2006 | Vertelney | G01C 21/36 701/532 |
| 2012/0176255 A1* | 7/2012 | Choi | G06Q 10/00 340/989 |

(Continued)

OTHER PUBLICATIONS

Lily Feinn, "How to Save Your Parking Spot in Google Maps & Never Search for Your Lost Car Again", 10 pages, Apr. 27, 2017.

(Continued)

*Primary Examiner* — Shardul D Patel
(74) *Attorney, Agent, or Firm* — Arent Fox LLP

(57) ABSTRACT

Disclosed are methods, systems, and computer-readable mediums for providing last mile navigation. In an example, the system may determine that a vehicle has arrived at or near the destination. The system may store the destination in memory when determined that the vehicle has arrived at or near the destination. The system may monitor the location of the vehicle and determine the vehicle is parked at a parked location. Once determined that the vehicle is parked, the system may transmit last mile navigation information associated with the destination and the parked location to a mobile device.

20 Claims, 5 Drawing Sheets

(56) References Cited

U.S. PATENT DOCUMENTS

| | | | | |
|---|---|---|---|---|
| 2013/0274993 A1* | 10/2013 | Gregg | ............... | G07C 5/085 |
| | | | | 701/33.4 |
| 2015/0039224 A1* | 2/2015 | Tuukkanen | ......... | H04W 4/025 |
| | | | | 701/500 |
| 2015/0293576 A1* | 10/2015 | Hanaoka | ........... | G07C 9/00309 |
| | | | | 713/323 |
| 2016/0377449 A1* | 12/2016 | Gerlach | ............... | G06F 16/29 |
| | | | | 701/424 |
| 2018/0108259 A1* | 4/2018 | Lin | ............... | B60R 25/33 |
| 2018/0374349 A1* | 12/2018 | Mowatt | ............... | G07B 15/02 |
| 2019/0096254 A1* | 3/2019 | Havercamp | ........... | G06N 20/00 |
| 2019/0311616 A1* | 10/2019 | Jin | ............... | G08G 1/096783 |
| 2020/0005197 A1* | 1/2020 | Bottcher | ............ | G06Q 10/02 |

OTHER PUBLICATIONS

Xiaoyi Fan, et al, "CrowdNavi: Demystifying Last Mile Navigation With Crowdsourced Driving Information", IEEE Transactions on Industrial Informatics, vol. 13, No. 2, Apr. 2017, pp. 771-781.

Yuanchao Shu et al., "Last-Mile Navigation Using Smartphones", pp. 1-13.

* cited by examiner

METHODS AND SYSTEMS FOR LAST MILE NAVIGATION CACHE POINT OF INTEREST

TECHNICAL FIELD

The present disclosure relates to methods and systems for last mile navigation cache point of interest.

BACKGROUND

Vehicle navigation systems provide navigation instructions for a user to drive to a specified destination. To receive navigation instructions, the user enters a destination, such as a point of interest (POI) or an address, into a vehicle navigation system via buttons (e.g., physical buttons and knobs or touchscreen buttons), or provides voice commands to the vehicle navigation system. Typically, the destination may be entered by the user through selection of the destination from a list of POIs or a user may enter a specific address for the destination. Once the user has entered a destination, the vehicle navigation system calculates one or more routes for driving to the destination and provides the route(s) to the user via a display. The user may then select one of the routes and receive visual and/or audio instructions on driving to the specified destination based on the selected route. When the vehicle arrives at the destination, the vehicle navigation system alerts the user of the arrival at the destination through a visual and/or audio alert and then clears the destination from memory of the vehicle navigation system to allow for a next destination to be entered by the user. For many users, parking at the destination may be unavailable, and the user may then drive some distance away from the destination to a parking location. However, for many of these users additional directions (i.e., last mile navigation instructions) between a parked location and the destination are also needed for the users to arrive at the destination.

Therefore, there is a need in the art for methods and systems for providing last mile instructions to a user to arrive at a destination.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a system of a vehicle is provided. The system may include a memory storing instructions for providing last mile navigation for a user. The system may also include one or more processors coupled with the memory and configured to execute the instructions. The one or more processors may receive a destination for a vehicle. The one or more processors may also determine that the vehicle has arrived at or near the destination. The one or more processors may further store the destination in the memory based on determining that the vehicle has arrived at or near the destination. The one or more processors may also determine the vehicle is parked at a parked location. The one or more processors may further transmit last mile navigation information associated with the destination and the parked location to a mobile device.

In another example, a method for providing last mile navigation to a user is provided. The method may include receiving a destination for a vehicle. The method may also include determining that the vehicle has arrived at or near the destination. The method may further include storing the destination in a memory based on determining that the vehicle has arrived at or near the destination. The method may also include determining the vehicle is parked at a parked location. The method may further include transmitting the last mile navigation information associated with the destination and the parked location to a mobile device.

In another example, a computer-readable medium storing executable code for adjusting pixels of a display screen in a vehicle is provided. The computer-readable medium may include code to receive a destination for a vehicle. The computer-readable medium may also include code to determine that the vehicle has arrived at or near the destination. The computer-readable medium may further include code to store the destination in the memory based on determining that the vehicle has arrived at or near the destination. The computer-readable medium may also include code to determine the vehicle is parked at a parked location. The computer-readable medium may further include code to transmit last mile navigation information associated with the destination and the parked location to a mobile device.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative implementations when read in conjunction with the accompanying drawings, wherein:

DETAILED DESCRIPTION

Figure 1:
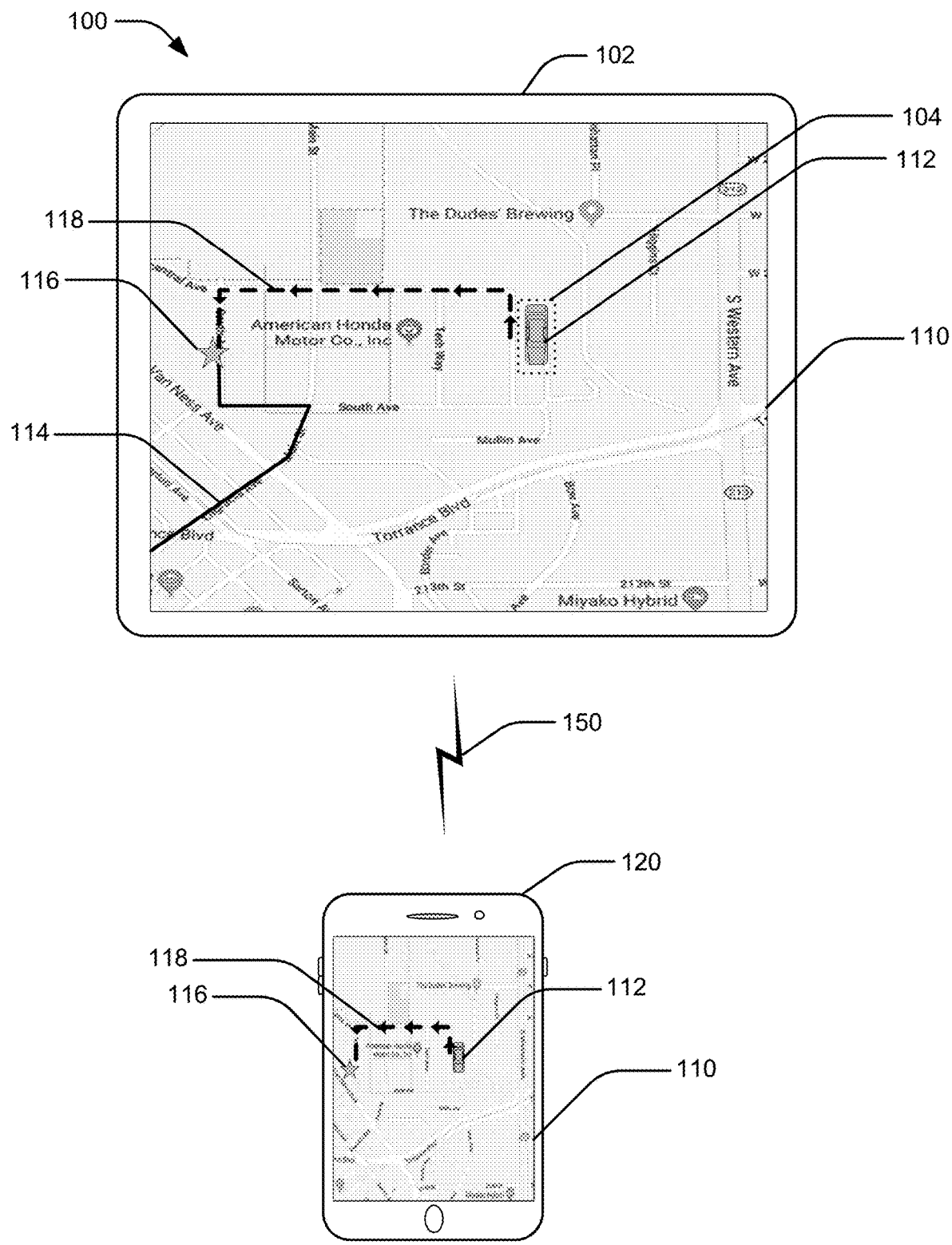
FIG. 1 illustrates an example of a navigation system according to one aspect of the disclosure.

The following includes definitions of selected terms employed herein. The definitions include various examples and/or forms of components that fall within the scope of a term and that may be used for implementation. The examples are not intended to be limiting.

The term "bus," as used herein, may refer to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area Network (CAN), Local Interconnect Network (LIN), among others.

The term "vehicle," as used herein, may refer to any moving vehicle that is capable of carrying one or more human occupants. The term "vehicle" may include, but is not limited to: cars, trucks, vans, minivans, SUVs, motorcycles, scooters, boats, personal watercrafts, or aircrafts.

The term "memory," as used herein, may include volatile memory and/or nonvolatile memory. Non-volatile memory may include ROM (read only memory), PROM (programmable read only memory), EPROM (erasable PROM) and EEPROM (electrically erasable PROM). Volatile memory may include RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, may include a connection by which entities are "operably connected", is one in which signals, physical communications, and/or logical communications may be sent and/or received. An operable connection may include a physical interface, a data interface, and/or an electrical interface.

The term "processor," as used herein, may refer to a device that processes signals and performs general computing and arithmetic functions. Signals processed by the processor may include digital signals, data signals, computer instructions, processor instructions, messages, a bit, a bit stream, or other computing that may be received, transmitted and/or detected. A processor may include microprocessors, microcontrollers, digital signal processors (DSPs), field programmable gate arrays (FPGAs), programmable logic devices (PLDs), state machines, gated logic, discrete hardware circuits, or other suitable hardware configured to perform the various functionality described herein.

The term "vehicle system," as used herein, may refer to an electronically controlled system on a vehicle operable to perform certain actions on components of the vehicle, which may provide an interface to allow operation by another system or graphical user interaction. The vehicle system may include, but are not limited to, vehicle ignition systems, vehicle conditioning systems (e.g., systems that operate a windshield wiper motor, a windshield washer fluid motor or pump, a defroster motor, heating, ventilating, or air conditioning (HVAC) controls), vehicle audio systems, vehicle security systems, vehicle video systems, vehicle infotainment systems, vehicle telephone systems, and/or the like.

The term "vehicle applications" or "applications," as used herein, may refer to any software run by the vehicle system, which may provide information or data to a user of the vehicle, or may receive information or data from a user of a vehicle. The vehicle applications may be displayed on the screen and may include, but are not limited to, navigation, radio, telephone, settings, electric charging, status information, cameras, web browsers, e-mail, games, utilities, and/or the like.

The term "graphical user interface," "GUI," or "user interface," as used herein, may refer to a type of interface that allows users to interact with electronic devices, the vehicle system, the vehicle, vehicle applications or the like, through graphical icons, visual indicators such as secondary notation, text-based, type command labels, text navigation, and/or the like.

The term "screen," "display screen," or "display," as used herein, may refer to a surface area upon which text, graphics and video are temporarily made to appear for human viewing. These may include, but are not limited to, eidophor, electroluminescent display ("ELD"), electronic paper, e-Ink, gyricon, light emitting diode display ("LED"), cathode ray tube ("CRT"), liquid-crystal display ("LCD"), plasma display panel ("PDP"), digital light processing ("DLP"), and/or the like.

The term "communications device," as used herein, may refer to a device that facilitates intercommunication among vehicle systems, communication with the vehicle systems via one or more other systems or devices, etc. In an example, communication device may interface with other systems, such as a remote device (e.g., mobile device), other computers, etc., via a wireless communication technology, such as a cellular technology, Bluetooth, etc. using a corresponding modem or transceiver.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Referring to FIG. 1, an example navigation system 100 according to implementations of the present disclosure is illustrated. The navigation system 100 may include an in-vehicle navigation system 102 and a mobile device 120. As shown by FIG. 1, the in-vehicle navigation system 102 may display a navigation image 110 which may include a map associated with the navigation system. The navigation image 110 may also include one or more icons including a vehicle icon 112, a navigation destination path 114, a destination 116, a last mile navigation 118, a parked location 104, and/or various other points of interests. The vehicle icon 112 may represent a current location of a vehicle (e.g., vehicle 200 of FIG. 2) on the map. The navigation destination path 114 may represent a destination path for the user to follow to arrive at the destination 116 while the user is driving the vehicle. In an example, the user may drive along a route corresponding to the navigation destination path 114 to arrive at the destination 116.

Once the vehicle arrives at the destination 116, the in-vehicle navigation system 102 may indicate the arrival to the user by video and/or audio alert. However, in this example, parking at the destination 116 may be unavailable at or near the destination 116. For example, parking may not be available at the destination 116 due to the cost of parking at or near the destination 116, limited availability of parking at or near the destination 116, or due to the user wanting to avoid traffic at or around the destination 116 before or after an event at the destination 116. Regardless of the reason, the user may park some distance away from the destination 116 at the parked location 104, as illustrated by FIG. 1.

For a typical navigation system, soon after alerting the user of the arrival of the vehicle at the destination 116, the navigation system removes the destination 116 from memory (e.g., cache) of the navigation system. However, this may cause the user to be lost or confused on how to arrive at the destination 116 after parking the vehicle 112 at the parked location 104.

In the present disclosure, the navigation system 100 provides the last mile navigation 118 to the user. The last mile navigation 118 provides a route for the user to arrive at the destination 116 from the parked location 104. In implementations described here, the in-vehicle navigation system 102, soon after alerting the user of the arrival of the vehicle 112 at the destination 116, caches the destination 116 in memory of the in-vehicle navigation system 102. The in-vehicle navigation system 102 continues to store the destination 116 in memory at least until determined that the vehicle 112 has parked at a parking location (e.g., parked location 104).

Once determined that the vehicle 112 is parked, the in-vehicle navigation system 102 communicates via communication signals 150 with the mobile device 120. During the communication, the in-vehicle navigation system 102 may send a push notification to the mobile device 120 such that the mobile device 120 may provide the last mile navigation 118 to the user while the user travels (e.g., on foot) between the parked location 104 and the destination 116.

In some implementations, the in-vehicle navigation system 102 may provide a last mile navigation based on the destination 116 and one or more waypoints to the user. For example, the navigation image 110 may include additional destinations or waypoints (not shown) and a navigation destination path may represent a navigation destination path for the user to follow to arrive at the destination 116 and/or the waypoints. In an example, the navigation destination path may include one or more waypoints before and/or after the destination 116. In this implementation, once determined that the vehicle 112 is parked, the in-vehicle navigation system 102 may communicate with the mobile device 120 to provide a last mile navigation between the parked location 104 and the destination 116 and/or the one or more waypoints. For example, the last mile navigation may provide instructions for the user to walk from the parked location 104 to a first waypoint, from the first waypoint to the destination 116, and from the destination 116 to a second waypoint. In another example, the last mile navigation may provide multiple instructions for the user to walk to each of the waypoints and the destination 116, and thereby provide options for the user to select a last mile navigation to follow.

Further implementations of the navigation system 100 for providing last mile navigation 118 are described below in reference to FIGS. 2-5.

Figure 2:
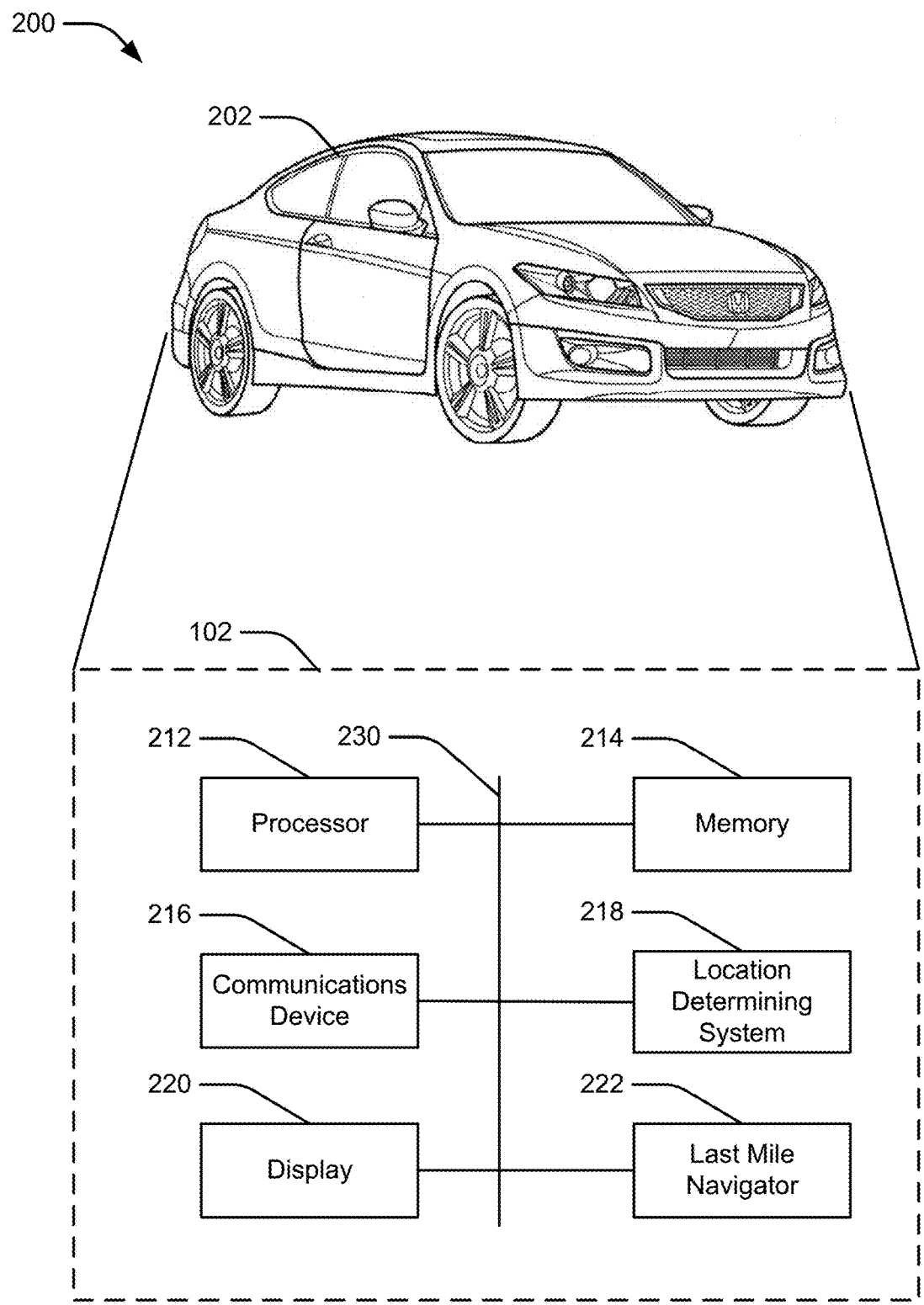
FIG. 2 illustrates a schematic view of an example operating environment of a navigation system according to one aspect of the disclosure.

FIG. 2 shows a schematic view of an example of an operating environment 200 of the in-vehicle navigation system 102 and example methods according to aspects described herein. The operating environment 200 may include a vehicle 202, within which the in-vehicle navigation system 102 may at least partially reside and/or be implemented. Components of the in-vehicle navigation system 102, as well as the components of other systems, hardware architectures and software architectures discussed herein, may be combined, omitted or organized into different architectures for various aspects of the disclosure. However, the example aspects and configurations discussed herein focus on the operating environment 200 as illustrated in FIG. 2, with corresponding system components and related methods.

The in-vehicle navigation system 102 may include or be operably coupled with (or executed by) one or more processors 212 and memory 214 that communicate to effectuate certain functions or actions, as described herein. The one or more processors 212 may be configured to execute instructions or code stored on the memory 214. In an implementation, the instructions or code may include instructions or code for providing last minute navigation 118, as described herein.

The in-vehicle navigation system 102 may additionally include or be operably coupled with a communications device 216, which may include substantially any wired or wireless device, or related modem, etc., for providing wired or wireless communications utilizing various protocols to send/receive electronic signals internally to features and systems within the vehicle 202 and/or to external devices including mobile device 120. In an example, the communications device 216 may communicate using one or more radio technologies (e.g., 3GPP radio access technologies, IEEE 802.11, Bluetooth®, etc.).

The in-vehicle navigation system 102 may additionally include or be operably coupled with a location determining system 218 for determining a location/position of the vehicle 202. For example, the location determining system 218 may determine one or more location-related parameters, such as location, position, speed, acceleration, and direction, among other parameters, of the vehicle 202. In some examples, the location determining system 218 may include or may be operably coupled with a global positioning system ("GPS") device (or other latitude/longitude determination device), a speedometer, an accelerometer, a gyroscope, and/or the like, to determine the location-related parameters.

Additionally, the in-vehicle navigation system 102 may include or be operably coupled with a display 220 (interchangeably referred to herein as a screen) for displaying the navigation image 110 and/or vehicle information (e.g., tachometer, speedometer, fuel gauge, heating/cooling), infotainment information (e.g., radio, media files, navigation system), and/or any other information or applications related to one or more vehicle systems. In some examples, the display 220 may include a liquid crystal display (LCD) and/or variants thereof, plasma display, etc., and/or may be part of a touchscreen display. In some examples, the display 220 may be configured to accept inputs from a user regarding selections or preferences of the user via a graphical user interface (GUI).

The in-vehicle navigation system 102 may also include or be operably coupled with a last mile navigator 222 for determining a last mile navigation 118 for a user. In an example, the last mile navigator 222 may receive the destination 116. In some examples, the destination 116 may be received from the user. The user may input the destination via, for example, the display 220 or any other means of entering information of the destination 116. The in-vehicle navigation system 102 may then calculate the destination path 114 for the vehicle 202 to arrive at the destination 116. The last mile navigator 222 may monitor a driving route of the vehicle 202 and determine that the vehicle 202 has arrived at or near the destination 116 based on the location-related parameters from the location determining system 218. Once the last mile navigator 222 determines that the vehicle 202 has arrived at or near the destination 116, the last mile navigator 222 may store the destination 116 in memory 214. In some examples, once the last mile navigator 222 determines that the vehicle is at or near the destination 116, the destination path 114 may be cleared from the in-vehicle navigation system 102. In some examples, the destination 116 may remain in memory 214 at least until the last mile navigator 222 determines that the vehicle 202 has parked (e.g., at parked location 104). In some examples, the last mile navigator 222 may determine that the vehicle 202 has parked based on one or more of the location-related parameters from the location determining system 218, the vehicle 202 being in a parked state (e.g., gear box in park position), a response to a visual or audio prompt asking the user if the vehicle is parked.

In some examples, once determined that the vehicle 202 is parked, the last mile navigator 222 may calculate the last mile navigation 118. The calculation may include one or more routes for a user to arrive at the destination 116 from the parked location 104. The one or more routes may include information for the user to travel by foot, bicycle, public transit, and/or any other method of transportation to the destination 116.

Once determined that the vehicle 202 is parked, the last mile navigator 222 may also communicate with the mobile device 120 to provide information for the mobile device 120 to provide last mile navigation 118 to the user. In an example, the communication from the last mile navigator 222 may be a push notification to the mobile device 120 providing the information. In some examples, the information may include the last mile navigation 118 including, for example, instructions for the user to travel between the parked location 104 and the destination 116. The instructions may include directions for the user to travel by foot, bicycle, public transit, and/or any other method of transportation. In some examples, the information may include a location of the destination 116 and a location of the parked location 104 such that the mobile device 120 may calculate the last mile navigation 118.

In some implementations, the last mile navigator 222 may receive the destination 116 and one or more waypoints. The in-vehicle navigation system 102 may then calculate a destination path for the vehicle 202 to arrive at the destination 116 and/or the one or more waypoints. As described above, the last mile navigator 222 may monitor a driving route of the vehicle 202, determine that the vehicle 202 has arrived at or near the destination 116, and store the destination 116 in memory 214. Once determined that the vehicle 202 is parked, the last mile navigator 222 may calculate a last mile navigation for the destination 116 and/or the one or more waypoints. For example, the calculation may include one or more routes for a user to arrive at the destination 116 and/or the one or more waypoints from the parked location 104. Once determined that the vehicle 202 is parked, the last mile navigator 222 may communicate with the mobile device 120 to provide information for the mobile device 120 to provide the last mile navigation to the user. In some examples, the information may include instructions for the user to travel between the parked location 104 and the destination 116 and/or the one or more waypoints. For example, the information may include instructions for the user to travel from the parked location 104 to a first waypoint, from the parked location 104 to the destination 116, and from the destination 116 to a second waypoint. In another example, the information may include instructions for the user to travel from the parked location 104 to each of the first waypoint, the parked location 104, and the destination 116 (i.e., multiple last mile navigations), and thereby provide options for the user to select a last mile navigation to follow.

In some examples, the various components of the in-vehicle navigation system 102 may be operably coupled to one another via one or more busses 230 to facilitate communication among the components to perform functions described herein. Moreover, one or more of the components described for the in-vehicle navigation system 102 may be part of another system. For example, one or more of the processors 212, the memory 214, the communications device 216, the location determining system 218, the display 220, or the last mile navigator 222 may be part of one or more of an infotainment system, a navigation system, or safety system of the vehicle 202.

Figure 3:
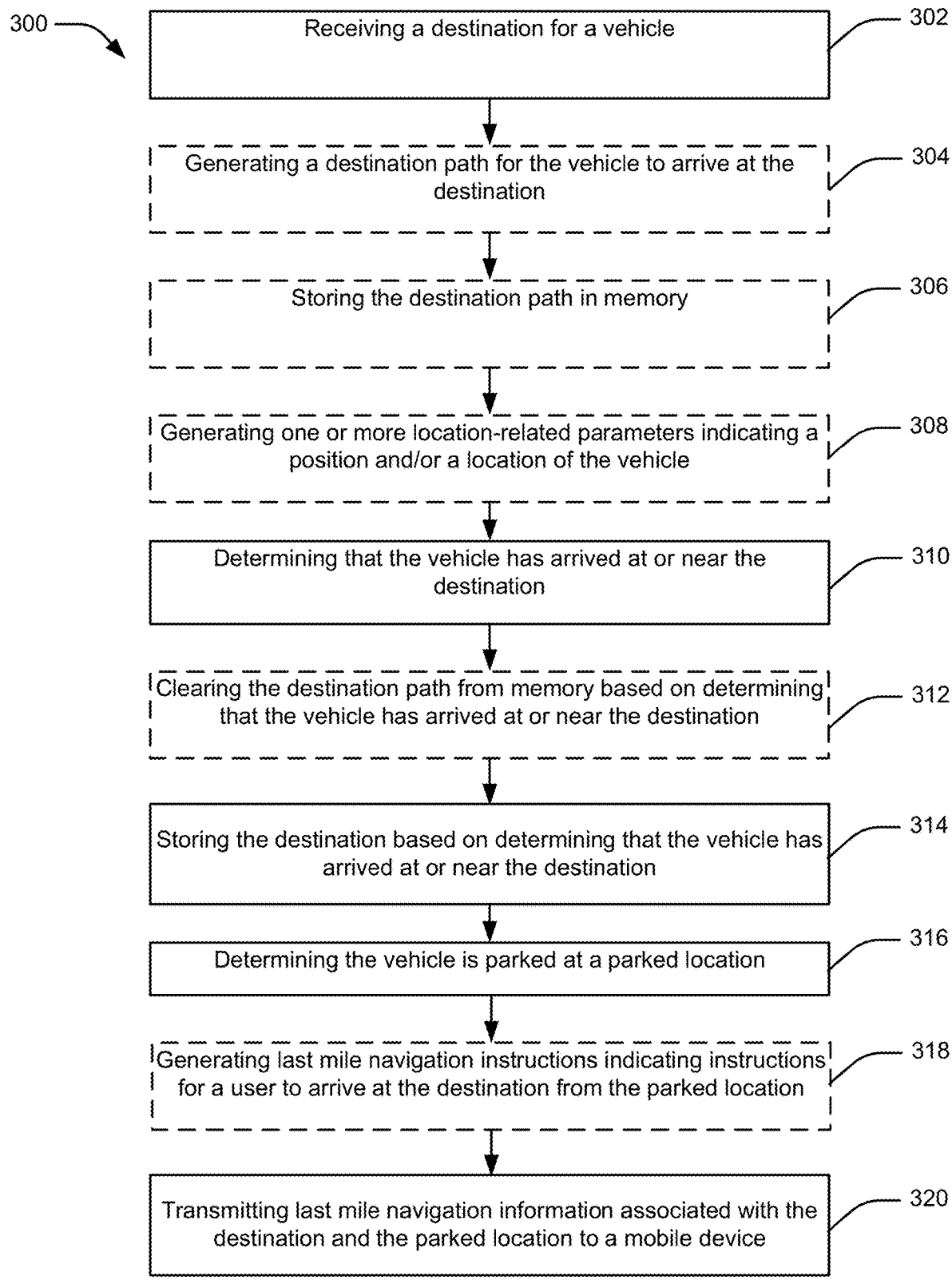
FIG. 3 illustrates a flowchart illustrating an example method for providing last mile navigation according to one aspect of the disclosure.

Referring to FIG. 3, a method 300 for providing last mile navigation is shown therein. In an example, the method 300 may be performed by the operating environment 200 of FIG. 2. At block 302, the method 300 may include receiving a destination for a vehicle. For example, the processor 212 may receive a destination 112 for the vehicle 202. In an example, the destination 112 may be received from a user.

At block 304, the method 300 may optionally include generating a destination path for the vehicle to arrive at the destination based on the received the destination. For example, the processor 212 may generate the destination path 114 for the vehicle 202 to arrive at the destination 116. In an example, the processor 212 may generate the destination path 114 by calculating one or more potential routes for the user to arrive at the destination 116 based on a current location of the vehicle 202. The processor 212 may use location-related parameters generated by the location determining system 218 to determine a current location of the vehicle 202.

At block 306, the method 300 may optionally include storing the destination path in memory. For example, the processor 212 may store the destination path 114 in the memory 214 such that the destination path 114 may be obtained so that driving instructions to the destination 116 are provided.

At block 308, the method 300 may optionally include generating one or more location-related parameters indicating a position and/or a location of the vehicle. For example, the location determining system 218 may generate one or more location-related parameters indicating a position and/or a location of the vehicle 202. In an example, the location-related parameters may be generated based on information obtained from one or more of the GPS device, speedometer, accelerometer, gyroscope and/or the like to determine location-related parameters.

At block 310, the method 300 may include determining that the vehicle has arrived at or near the destination. For example, the processor 212 may determine that the vehicle 202 has arrived at or near the destination 116. In an example, the processor 212 may obtain the location-related parameters generated by the location determining system 218 and may determine that the vehicle 202 has arrived at or near the destination 116 based on the location-related parameters.

At block 312, the method 300 may optionally include clearing the destination path from the memory based on determining that the vehicle has arrived at or near the destination. For example, the processor 212 may cause that the destination path 114 is cleared from the memory 214 when the vehicle 202 arrives at or near the destination 116.

At block 314, the method 300 may include storing the destination in memory based on determining that the vehicle has arrived at or near the destination. For example, the processor 212 may cause the destination 116 to be stored, or that the destination 116 is to remain stored, in memory 214 when the vehicle 202 arrives at or near the destination 116.

At block 316, the method 300 may include determining the vehicle is parked at a parked location. For example, the processor 212 may determine that the vehicle 202 is parked at the parked location 104. In some examples, the processor 212 may determine that the vehicle 202 is parked based on one or more of the location-related parameters from the location determining system 218 and or a parked status (e.g., a park position of a gearbox) of the vehicle 202.

At block 318, the method 300 may optionally include generating last mile navigation instructions indicating instructions for a user to arrive at the destination from the parked location. For example, the processor 212 may generate last mile navigation instructions (e.g., last mile navigation 118) indicating instructions for a user to arrive at the destination 116 from the parked location 104. The processor 212 may calculate the last mile navigation instructions based on calculated routes from the parked location 104 to the destination 116 based on one or more of the user to traveling by foot, bicycle, public transit, and/or any other method of transportation to the destination 116.

At block 320, the method 300 may include transmitting the last mile navigation information associated with the destination and the parked location to a mobile device. For example, one or more of the processor 212 and the communications device 216 may transmit the last mile navigation information the mobile device 120. In an example, the last mile navigation information may be transmitted via a push notification. In some examples, the last mile navigation information may indicate the destination and the parked location for the mobile device 120 to generate last mile navigation instructions. In some examples, the last mile information may include the last mile navigation instructions.

Figure 4:
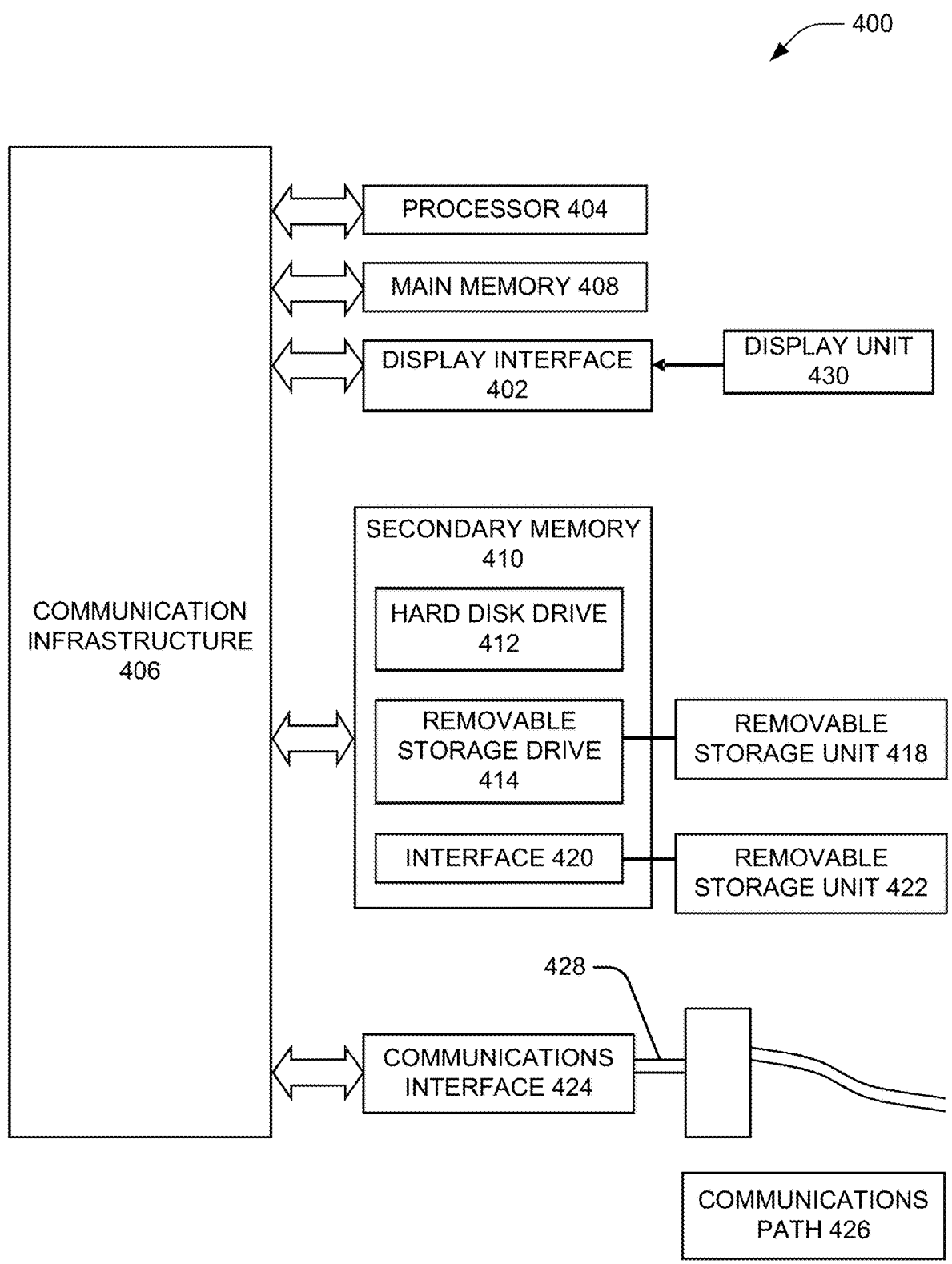
FIG. 4 presents an example system diagram of various hardware components and other features according to one aspect of the disclosure.

Referring to FIG. 4, an example system is presented with a diagram of various hardware components and other features, for use in accordance with an aspect of the present disclosure. Aspects of the present disclosure may be implemented using hardware, software, or a combination thereof and may be implemented in one or more computer systems or other processing systems. In one example variation, aspects described herein may be directed toward one or more computer systems capable of carrying out the functionality described herein. An example of such a computer system 400 is shown in FIG. 4.

The computer system 400 may include one or more processors, such as processor 404. The processor 404 is connected to a communication infrastructure 406 (e.g., a communications bus, cross-over bar, or network). The processor 404 may be an example of the processor 212. Various software aspects are described in terms of this example computer system 400. After reading this description, it will become apparent to a person skilled in the relevant art(s) how to implement aspects described herein using other computer systems and/or architectures.

The computer system 400 may include a display interface 402 that forwards graphics, text, and other data from the communication infrastructure 406 (or from a frame buffer not shown) for display on a display unit 430. The display unit 430 may be an example of the display 220. The computer system 400 may also include a main memory 408, e.g., random access memory (RAM), and may also include a secondary memory 410. The secondary memory 410 may include, e.g., a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. The removable storage unit 418, represents a floppy disk, magnetic tape, optical disk, etc., which is read by and written to the removable storage drive 414. As will be appreciated, the removable storage unit 418 may include a computer usable storage medium having stored therein computer software and/or data.

In alternative aspects, the secondary memory 410 may include other similar devices for allowing computer programs or other instructions to be loaded into the computer system 400. Such devices may include, e.g., a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to the computer system 400. The memory 214 may include one or more of the main memory 408, the secondary memory 410, the removable storage drive 414, the removable storage unit 418, or the removable storage unit 422.

The computer system 400 may also include a communications interface 424. The communications interface 424 may allow software and data to be transferred between the computer system 400 and external devices. Examples of the communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by the communications interface 424. These signals 428 are provided to the communications interface 424 via a communications path (e.g., channel) 426. This path 426 carries signals 428 and may be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals 428. These computer program products provide software to the computer system 400. Aspects described herein may be directed to such computer program products. In an example, the communications device 216 may include the communications interface 424.

Computer programs (also referred to as computer control logic) may be stored in the main memory 408 and/or the secondary memory 410. The computer programs may also be received via the communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. The computer programs may include instructions or code for executing methods of the last mile navigation system 102.

In variations where aspects described herein are implemented using software, the software may be stored in a computer program product and loaded into the computer system 400 using the removable storage drive 414, the hard disk drive 412, or the communications interface 420. The control logic (software), when executed by the processor 404, causes the processor 404 to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
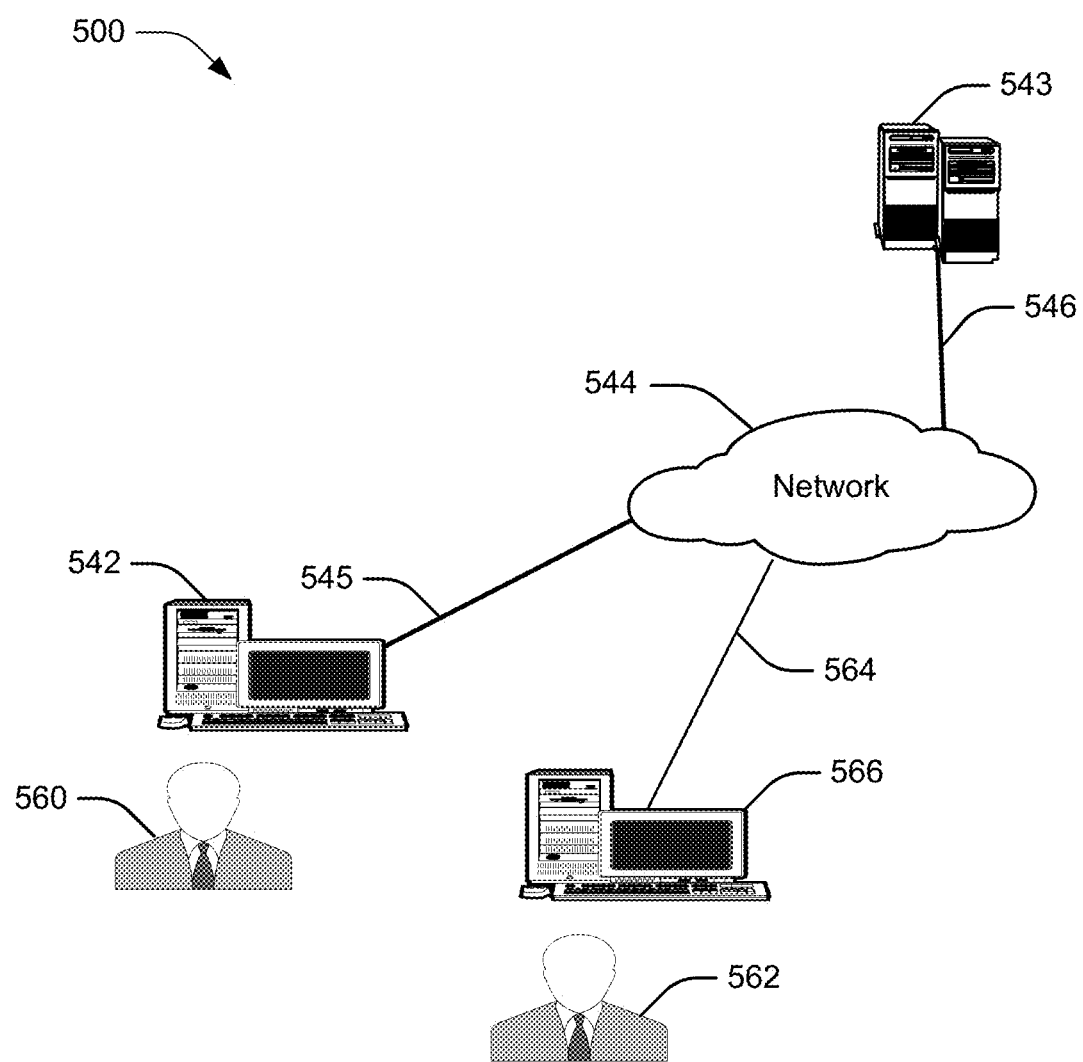
FIG. 5 is a block diagram of various example system components according to one aspect of the disclosure.

FIG. 5 is a block diagram of various example system components. FIG. 5 shows a communication system 500 including one or more accessors 560, 562 (also referred to interchangeably herein as one or more "users") and one or more terminals 542, 566. The terminals 542, 566 may include the vehicle 202 or a related system (e.g., last mile navigation system 102, the processor 212, the communications device 218, etc.), and/or the like. In one aspect, data for use in accordance with aspects described herein may be input and/or accessed by the accessors 560, 562 via the terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The couplings 545, 546, 564 may include wired, wireless, or fiberoptic links. In another example variation, the method and system in accordance with aspects described herein operate in a stand-alone environment, such as on a single terminal.

The aspects discussed herein may also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory storing instructions; and
one or more processors coupled with the memory and configured to execute the instructions to:
receive a destination for a vehicle;
determine that the vehicle has arrived at or near the destination;
store the destination in the memory based on determining that the vehicle has arrived at or near the destination;
determine the vehicle is parked at a parked location; and
transmit last mile navigation information associated with the destination and the parked location to a mobile device.

2. The system of claim 1, further comprising:
a location determining system configured to generate one or more location-related parameters indicating a position and/or a location of the vehicle,
wherein the one or more processors is further configured to determine that the vehicle has arrived at or near the destination based on the one or more location-related parameters.

3. The system of claim 1, wherein the one or more processors is further configured to:
generate a destination path for the vehicle to arrive at the destination;
store the destination path in the memory; and
clear the destination path from the memory based on determining that the vehicle has arrived at or near the destination.

4. The system of claim 1, wherein the one or more processors is further configured to:
generate last mile navigation instructions indicating instructions for a user to arrive at the destination from the parked location, wherein the last mile navigation information includes the last mile navigation instructions.

5. The system of claim 1, wherein the last mile navigation information indicates the destination and the parked location for the mobile device to generate last mile navigation instructions.

6. The system of claim 1, wherein the last mile navigation information is transmitted via a push notification.

7. The system of claim 1, wherein the destination is received from a user input.

8. A method for providing last mile navigation information, comprising:
receiving a destination for a vehicle;
determining that the vehicle has arrived at or near the destination;
storing the destination in a memory based on determining that the vehicle has arrived at or near the destination;
determining the vehicle is parked at a parked location; and
transmitting the last mile navigation information associated with the destination and the parked location to a mobile device.

9. The method of claim 8, further comprising:
generating one or more location-related parameters indicating a position and/or a location of the vehicle,
wherein the determining that the vehicle has arrived at or near the destination is based on the one or more location-related parameters.

10. The method of claim 8, further comprising:
generating a destination path for the vehicle to arrive at the destination based on the receiving the destination;
storing the destination path in the memory; and
clearing the destination path from the memory based on determining that the vehicle has arrived at or near the destination.

11. The method of claim 8, further comprising:
generating last mile navigation instructions indicating instructions for a user to arrive at the destination from the parked location, wherein the last mile navigation information includes the last mile navigation instructions.

12. The method of claim 8, wherein the last mile navigation information indicates the destination and the parked location for the mobile device to generate last mile navigation instructions.

13. The method of claim 8, wherein the last mile navigation information is transmitted via a push notification.

14. The method of claim 8, wherein the receiving the destination includes receiving the destination from a user input.

15. A non-transitory computer-readable medium storing executable code for providing last mile navigation information, comprising code to:

receive a destination for a vehicle;
determine that the vehicle has arrived at or near the destination;
store the destination in memory based on determining that the vehicle has arrived at or near the destination;
determine the vehicle is parked at a parked location; and
transmit the last mile navigation information associated with the destination and the parked location to a mobile device.

16. The non-transitory computer-readable medium of claim 15, further comprising code to:
generate one or more location-related parameters indicating a position and/or a location of the vehicle; and
determine that the vehicle has arrived at or near the destination based on the one or more location-related parameters.

17. The non-transitory computer-readable medium of claim 15, further comprising code to:
generate a destination path for the vehicle to arrive at the destination;
store the destination path in the memory; and
clear the destination path from the memory based on determining that the vehicle has arrived at or near the destination.

18. The non-transitory computer-readable medium of claim 15, further comprising code to:
generate last mile navigation instructions indicating instructions for a user to arrive at the destination from the parked location, wherein the last mile navigation information includes the last mile navigation instructions.

19. The non-transitory computer-readable medium of claim 15, wherein the last mile navigation information indicates the destination and the parked location for the mobile device to generate last mile navigation instructions.

20. The non-transitory computer-readable medium of claim 15, wherein the last mile navigation information is transmitted via a push notification.

* * * * *